United States Patent [19]

Tillman

[11] Patent Number: 4,500,491
[45] Date of Patent: Feb. 19, 1985

[54] CHANGING OIL TUBES IN A CARBON BLACK REACTOR

[75] Inventor: Willie Tillman, Vinton, La.

[73] Assignee: Phillips Petroleum Company, Bartlesville, Okla.

[21] Appl. No.: 533,913

[22] Filed: Jun. 13, 1983

Related U.S. Application Data

[62] Division of Ser. No. 383,371, May 28, 1982, Pat. No. 4,418,049.

[51] Int. Cl.³ .......................... C01B 31/02; C09C 1/48
[52] U.S. Cl. .................................................. 422/150
[58] Field of Search ................................. 422/150–159; 423/449, 450

[56] References Cited

U.S. PATENT DOCUMENTS

| | | | |
|---|---|---|---|
| 3,523,758 | 8/1970 | Austin et al. | 422/150 X |
| 4,224,284 | 9/1980 | Cheng | 422/156 |
| 4,228,131 | 10/1980 | Rothbühr | 422/156 |
| 4,383,973 | 5/1983 | Cheng | 422/151 |

Primary Examiner—Thomas Wyse

[57] ABSTRACT

A carbon black reactor is equipped with multiple feedstock nozzles which revolve into axial alignment with the reactor throat.

5 Claims, 2 Drawing Figures

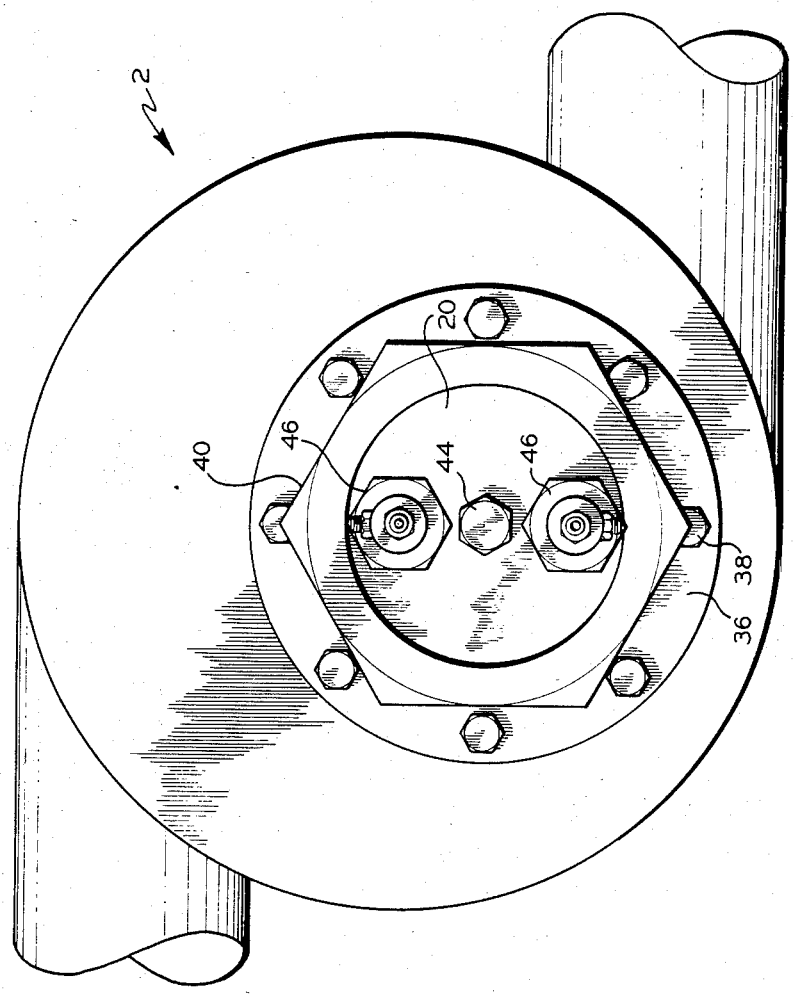

CHANGING OIL TUBES IN A CARBON BLACK REACTOR

This is a division of application Ser. No. 383,371, filed May 28, 1982, U.S. Pat. No. 4,418,049.

BACKGROUND

This invention relates to carbon black production. In one aspect, the invention relates to an apparatus for producing carbon black. In another aspect, the invention relates to a method for producing carbon black.

In the production of carbon black in reactors utilizing axial introduction of the carbonaceous make oil into the reaction flow passage from the upstream end of the reactor, it is frequently desirable to change the nozzle through which make oil is emitted into the reaction flow passage, since the properties of the carbon black being produced can be thus varied. For example, it can sometimes be desirable to change from a nozzle which emits feedstock at an included angle of 20° to a nozzle which emits feedstock at an included angle of 60°.

It would frequently take an hour or more in the prior art to make the switch between the feedstock nozzles using two or more operators. Where soft black was being produced by heat from the partial burning of the carbonaceous feedstock, pulling the old nozzle from the reactor would result in the loss of reactor off-gas. Downstream equipment would begin to cool, making possible the formation of acidic condensate. Condensate formation is very undesirable, as the acid condensate can attack downstream equipment, particularly the filter bags. Additionally, the wet pellet dryer is frequently heated in part by reactor off gas, and when the reactor was taken off line as during a nozzle change, the dryer would have to be heated entirely with fuel gas, an additional expense. Obviously, it would be desirable to accomplish the nozzle changeover as quickely as possible.

OBJECTS OF THE INVENTION

It is thus an object of this invention to provide method and apparatus to effect a quick nozzle change in a carbon black reactor.

SUMMARY OF THE INVENTION

In accordance with one aspect of the present invention, in a carbon black reactor comprising a generally cylindrical reaction chamber having a longitudinal axis, said generally cylindrical reaction chamber being bounded at an upstream end by an upstream end wall, the improvement is provided which comprises in association with the upstream end wall a means for positioning at least two feedstock tubes, each feedstock tube having a longitudinal axis, with the longitudinal axis of each tube being parallel to the longitudinal axis of the generally cylindrical reaction chamber, said means for positioning at least two feedstock tubes being rotatable about a longitudinal axis generally equidistant from and generally parallel to the longitudinal axes of the at least two feedstock tubes and being positioned so that each feedstock tube is revolvable into axial alignment with the longitudinal axis of the generally cylindrical reaction chamber. With this specially designed reactor, the amount of time during which the carbon black reactor is off line for a nozzle change can be reduced to a matter of seconds.

According to another aspect of the present invention, a method is provided comprising introducing a carbonaceous feedstock into the reaction flow passage of a carbon black reactor through a first feedstock tube, positioning a second feedstock tube parallel to a first feedstock tube, shifting the second feedstock tube into the position which was occupied by the first feedstock tube and introducing the carbonaceous feedstock axially into the carbon black reactor through the second feedstock tube. The method is advantageously practiced with the reactor provided in accordance with the present invention.

BRIEF DESCRIPTION OF THE DRAWING

FIG. 2 is an end view of the apparatus of FIG. 1, taken along the indicated lines of FIG. 1, and illustrating certain features of the present invention.

DETAILED DESCRIPTION OF THE DRAWINGS

Figure 1:
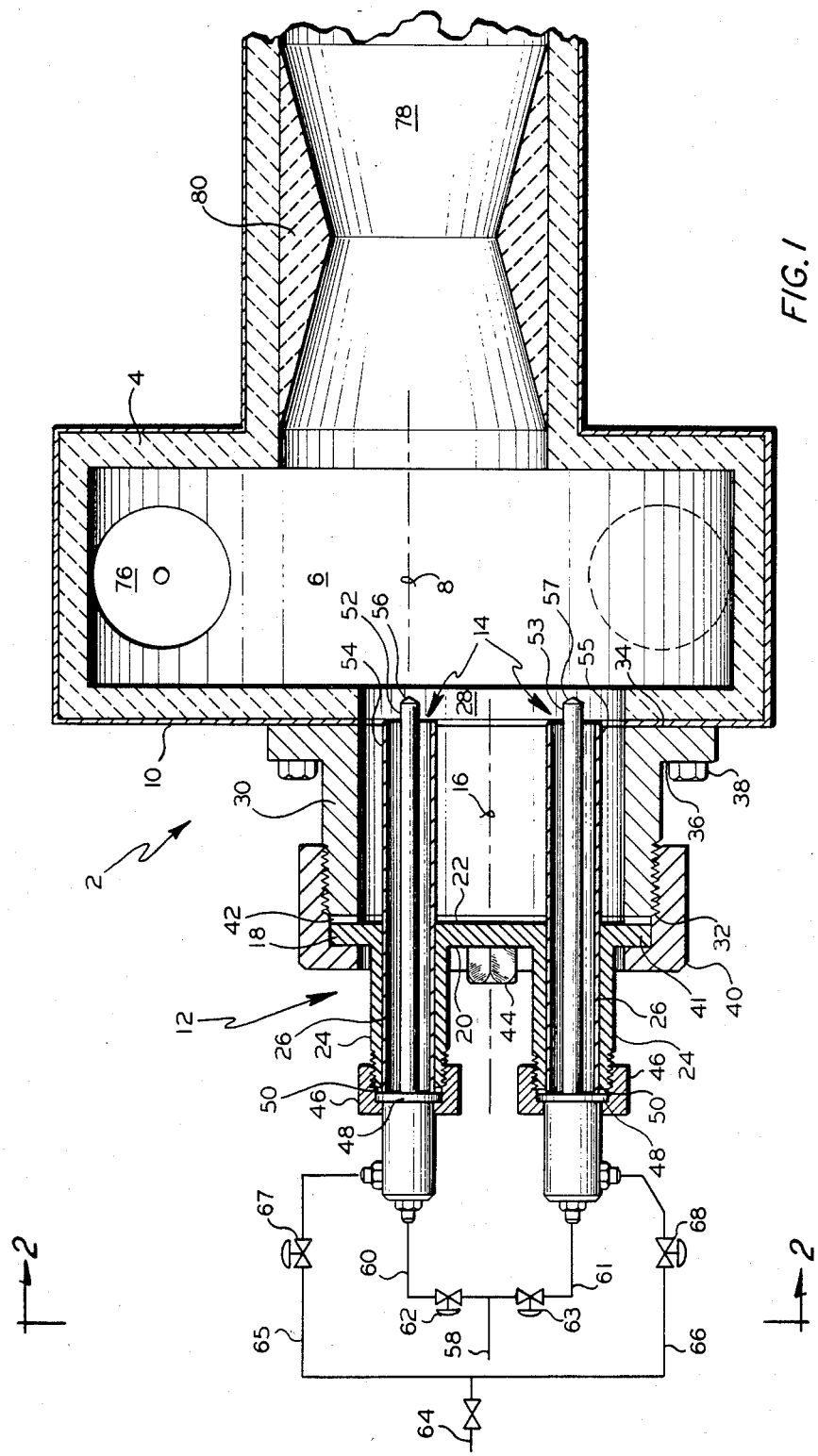
FIG. 1 is a side sectional view, partially in schematic, showing certain features one embodiment of the present invention.

According to the invention, an apparatus 2 for the manufacture of carbon black comprises a mass of refractory material defining a generally cylindrical precombustion chamber 6 having a longitudinal axis represented by the dashed line 8. The chamber 6 is bounded at its upstream end by an upstream end wall 10. In association with the upstream end wall 10 there is provided a means 12 for positioning at least two feedstock injectors 14 each of which has longitudinal axis with the longitudinal axis of each feedstock injector 14 being parallel to the longitudinal axis 8 of the generally cylindrical precombustion chamber 6. The means 12 for positioning the at least two feedstock injectors is rotatable around its longitudinal axis, which is illustrated by the dashed line 16. The longitudinal axis 16 of the means 12 is generally equidistant from and generally parallel to the longitudinal axis of the at least two feedstock injectors 14 and is positioned so that each feedstock injector 14 is revolvable into axial alignment with the longitudinal axis 8 of the generally cylindrical precombustion chamber 6.

Preferably, the means 12 comprises a plate 18 having a first surface 20 and an opposite second surface 22 with at least two tubular members or nipples 24 extending generally normally from the first surface 20 with a passage 26 through each tubular member 24 which passes through the plate 18, with each passage 26 being adapted for receiving a feedstock injector 14. The plate 18 is positioned in sealing relationship with a passage 28 which extends through the upstream end wall 10 of the reactor 2. The plate 18 is positioned so that the second surface 22 faces the generally cylindrical precombustion chamber 6 and is generally parallel to the upstream end wall 10.

Preferably, the plate 18 is in sealing relationship with an upstream end 32 of a tubular member 30. At the downstream end 34 of the tubular member 30 there is a radially outwardly extending flange 36 suitably fastened to the upstream end wall 10 of the reactor 2 by means such as bolts 38. The flange 36 circumscribes the passage 28 which extends through the upstream end wall 10 of the reactor 2. The tubular member 30 preferably extends generally normally from the upstream end wall 10 of the reactor 2 away from the generally cylindrical precombustion chamber 6.

Preferably, a collar 40 threadably engages the exterior of the tubular member 30 at its upstream end 32 and positions the plate 18 in a covering relationship with the upstream end 32 of the tubular member 30 by urging against the plate 18 via radially outwardly extending shoulder portion 41 and is preferably generally annularly shaped. It is desirable that an annular gasket 42 be positioned between the shoulder 41 of the plate 18 and the upstream end 32 of the tubular member 30. It is further desirable that a suitable lever receiving means such as nut 44 be affixed to the surface 20 of the plate 18. In the illustrated embodiment, the nut 44 is welded to the plate 18 along the longitudinal axis 16. The collar 40 is preferably provided with a wrench-receiving exterior shape, such as a hexagonal perimeter when taken in sectional across the axis 16.

During changeover operations, a feedstock injector 14 is positioned in the passage 26 which passes through each nipple 24. Collars 46 preferably threadably engage the exterior of the nipples 24 at their upstream ends and position a flange 48 affixed to each of the feedstock injectors 14 in covering relationship with the upstream end of each tubular member. Preferably, an annular gasket 50 is positioned between the flange 48 and the upstream end of each tubular member to aid in forming a reliable seal.

In the illustrated embodiment, each feedstock injector 14, commonly referred in the art as "an oil gun" comprises an inner tubular member 52 or 53 which carries oil concentrically disposed within an outer tubular member 54 or 55 which carries air for cooling. The inner tubular member 52 or 53 discharges through a nozzle 56 or 57, respectively, and into the precombustion zone 6. Generally, during the nozzle changeover, the nozzles 56 provided on the end of the oil tube 52 will be different for producing different carbon blacks, from the nozzle 57 provided on the end of the oil tube 53, although the invention provides its benefits even where the nozzle are the same, e.g., if nozzle 56, shown as on-stream, is plugging as by coking.

Generally, each tube 52 or 53 is connected to an oil source 58. Preferably each tube 52 or 53 is connected to a flexible oil line 60 or 61 and a valve 63 is positioned between the flexible line 60 or 61 and the oil source 58. The air tube 54 or 55 is connected to an air source 64. Air source 64 is connected to flexible hoses 65 and 66 to cooling air tubes 54 and 55, respectively. Hoses 65 and 66 have control valves 67 and 68 therein respectively. The oil gun on stream normally has about 4,000 standard cubic feet per hour of cooling air passed thereto, as via hose 65 in the FIG. 1. Cooling air is also preferably added to the oil gun off-stream as via conduit 66. Normally about 4,000 standard cubic feet of cooling air per hour is added also to the off-stream oil gun to prevent overheating of the gun.

In the use of the apparatus 2 to manufacture carbon black, hot air or combustion gases are introduced into the zone 6 via tangential tunnels 76. In the illustrated embodiment, "hard" black would preferably be manufactured, and the tunnels 76 would carry combustion gases, although it is to be understood that the present invention also is applicable to the manufacture of "soft" carbon blacks, in which event the tunnels 76 would carry heated air. For the manufacture of hard blacks, the zone 6 is preferably connected to a zone 78 which has a smaller diameter than the zone 6 and, if desired, can be provided with a venturi 80 for an improved flow pattern in the reaction mass.

The method according to the present invention comprises introducing a carbonaceous feedstock into the reaction flow passage of a carbon black reactor, such as the zone 6, through a first feedstock tube 52. The feedstock is preferably introduced along the longitudinal axis of the reactor. A second feedstock tube 53 is positioned parallel to the first feedstock tube 52. The second feedstock tube 53 is then shifted into the position which was occupied by the first feedstock tube, which, in the preferred embodiment, would be in axial alignment with the reaction flow passage in the carbon black reactor. The carbonaceous feedstock is then introduced from the source 58 axially into the carbon black reactor through the second feedstock tube. Generally, the first feedstock tube is shifted out of axial alignment with the reaction flow passage in the reactor prior to the shifting of the second feedstock tube into axial alignment with the reaction flow passage in the carbon black reactor. Prior to shifting the second feedstock tube into axial alignment with the reaction flow passage in the carbon black reactor, it is desirable to terminate the flow of carbonaceous feedstock through the first feedstock tube, in order to avoid feedstock deposition on the hot refractory defining the reaction flow passage. In the apparatus shown in the figures, the second feedstock tube revolves into axial alignment with the reaction flow passage in the carbon black reactor and the first feedstock tube is revolves out of alignment with the reaction flow passage of the carbon black reactor.

This can be accomplished by positioning the two feedstock tubes parallel to one another as shown in FIG. 1. Flow of carbonaceous feedstock to the oil tube 52 is discontinued by shutting valve 62. Collar 40 is loosened. A wrench is applied to the nut 44 and plate 18 is rotated until the second tubular member 53 is in axial alignment with the reaction flow passage, usually 180°. Collar 40 is tightened. Valve 63 is open and the flow of carbonaceous feedstock into the reactor is resumed.

A Typical Reactor 2 can have dimensions set forth as follows:

| Precombustion Zone 6: | |
| --- | --- |
| Diameter, inches, | 39 |
| Length, inches | 12 |
| Converging Zone: | |
| Inlet Diameter, inches | 14 |
| Outlet Diameter, inches | 8 |
| Diverging Zone: | |
| Inlet Diameter, inches, | 8 |
| Outlet Diameter, inches | 14 |
| Tangential Tunnels 76: | |
| Diameter, inches, | 8 |
| Passage 28: | |
| Diameter, inches, | 10 |
| Tubes 54 and 55: | |
| Diameter, inches | 3 |
| Tubes 52 and 53: | |
| Diameter, inches, (nozzle on top) | 1 |
| Plate 18: | |
| Diameter, inches, | 11.5 |
| Thickness, inches, | 0.25 |

The metal parts can be formed from 316 or better stainless steel.

While there have been illustrated and described certain preferred embodiments of the invention, it is not to be construed as so limited except to the extent of such limitations as found in the claims.

That which is claimed is:

1. In a carbon black reactor comprising a generally cylindrical reaction chamber having a longitudinal axis, said chamber being bounded at its upstream end by an upstream end wall, the improvement comprising, in association with the upstream end wall, a means for positioning at least two feedstock tubes each having a longitudinal axis with the longitudinal axis of each tube being parallel to the longitudinal axis of the generally cylindrical reaction chamber, said means for positioning at least two feedstock tubes being rotatable about a longitudinal axis generally equidistant from and generally parallel to the longitudinal axes of the at least two feedstock tubes and being positioned so that each feedstock tube is revolvable into axial alignment with the longitudinal axis of the generally cylindrical reaction chamber.

2. An apparatus as in claim 1 wherein said means for positioning at least two feedstock tubes comprises a plate having a first surface and an opposite second surface with at least two nipples extending generally normally from the first surface with a passage through each tubular member which passes through the plate, each passage adapted for receiving a feedstock tube, said plate being in sealing relationship with a passage through the upstream end wall of the carbon black reactor and positioned so that the second surface faces the generally cylindrical reaction chamber and is generally parallel to the upstream end wall.

3. An apparatus as in claim 1 further comprising a tubular member having an upstream end and a downstream end and a radially outwardly extending flange at its downstream end connected to the upstream end wall of the reactor with the flange circumscribing the passage through the upstream end wall of the reactor and the tubular member extending generally normally from the upstream end wall away from the generally cylindrical reaction chamber, wherein said plate is positioned in covering relationship with the upstream end of the tubular member.

4. An apparatus as in claim 3 further comprising a collar threadably engaging the exterior of the tubular member at its upstream end and positioning the plate in covering relationship with the upstream end of the tubular member.

5. An apparatus as in claim 4 further comprising a feedstock tube positioned in the passage through each tubular member.

* * * * *